United States Patent
Sorokin

(10) Patent No.: US 10,946,787 B2
(45) Date of Patent: Mar. 16, 2021

(54) MOTOR VEHICLE COMPRISING A LIGHTING MODULE FOR GENERATING A SET OF SYMBOLS

(71) Applicant: Bayerische Motoren Werke Aktiengesellschaft, Munich (DE)

(72) Inventor: Lenja Sorokin, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/562,955

(22) Filed: Sep. 6, 2019

(65) Prior Publication Data

US 2019/0389366 A1    Dec. 26, 2019

Related U.S. Application Data

(63) Continuation of application No. PCT/EP2018/054127, filed on Feb. 20, 2018.

(30) Foreign Application Priority Data

Mar. 9, 2017    (DE) .................. 10 2017 203 902.7

(51) Int. Cl.
*B60Q 1/00* (2006.01)
*B60Q 3/80* (2017.01)
(Continued)

(52) U.S. Cl.
CPC .......... *B60Q 1/0035* (2013.01); *B60Q 1/0023* (2013.01); *B60Q 3/80* (2017.02);
(Continued)

(58) Field of Classification Search
CPC .... G03B 21/14; G03B 21/145; G03B 21/147; G03B 21/208; G03B 21/562;
(Continued)

(56) References Cited

U.S. PATENT DOCUMENTS

2014/0203925 A1*  7/2014  Augst ............... B60Q 9/007
                                                    340/435
2016/0059771 A1   3/2016  Meinzer et al.
(Continued)

FOREIGN PATENT DOCUMENTS

DE   10 2006 050 546 A1   4/2008
DE   10 2008 061 747 A1   6/2009
(Continued)

OTHER PUBLICATIONS

International Search Report (PCT/ISA/210) issued in PCT Application No. PCT/EP2018/054127 dated Jun. 18, 2018 with English translation (four (4) pages).
(Continued)

*Primary Examiner* — Sultan Chowdhury
(74) *Attorney, Agent, or Firm* — Crowell & Moring LLP

(57) ABSTRACT

A motor vehicle is provided that includes a lighting module configured that generates a set of symbols on the ground in the surroundings of the motor vehicle and a control device that controls operation of the lighting module. The control device automatically adapts the relative position of the set of symbols (SY) to the motor vehicle such that at least part of the set of symbols is fixed in a predetermined location on the ground ahead of the motor vehicle when the distance of the motor vehicle to the predetermined location, on its way to the predetermined location, is less than a predetermined distance. The control device controls the operation of the lighting module such that the set of symbols is already generated before the distance of the motor vehicle to the predetermined location, on its way to the predetermined location, is less than the predetermined distance.

15 Claims, 2 Drawing Sheets

(51) Int. Cl.
*F21S 41/16* (2018.01)
*G03B 21/14* (2006.01)
*G03B 21/20* (2006.01)

(52) U.S. Cl.
CPC ............ *F21S 41/16* (2018.01); *G03B 21/147* (2013.01); *G03B 21/208* (2013.01); *G03B 21/2013* (2013.01); *G03B 21/2033* (2013.01); *B60Q 2400/50* (2013.01)

(58) Field of Classification Search
CPC ............ G03B 21/2013; G03B 21/2033; G03B 21/2053; B60Q 1/02; B60Q 1/04; B60Q 1/24; B60Q 1/26; B60Q 1/50; B60Q 1/0035; B60Q 3/14; B60Q 3/16; B60Q 3/64; B60Q 3/68; B60Q 3/74; B60Q 3/80
See application file for complete search history.

(56) References Cited

U.S. PATENT DOCUMENTS

2017/0166111 A1* 6/2017 Baccarin ................ G03B 21/14
2019/0051233 A1* 2/2019 Kweon .............. G02B 19/0014

FOREIGN PATENT DOCUMENTS

| | | |
|---|---|---|
| DE | 10 2009 009 472 A1 | 8/2010 |
| DE | 10 2013 211 877 A1 | 1/2015 |
| DE | 10 2014 204 316 A1 | 9/2015 |
| EP | 1 334 869 A2 | 8/2003 |
| JP | 2005-157873 A | 6/2005 |
| JP | 2008-143505 A | 6/2008 |
| JP | 2012-247369 A | 12/2012 |
| WO | WO 2007/119153 A2 | 10/2007 |

OTHER PUBLICATIONS

German-language Written Opinion (PCT/ISA/237) issued in PCT Application No. PCT/EP2018/054127 dated Jun. 18, 2018 (seven (7) pages).
German-language Search Report issued in counterpart German Application No. 10 2017 203 902.7 dated Oct. 17, 2017 with partial English translation (11 pages).

* cited by examiner

MOTOR VEHICLE COMPRISING A LIGHTING MODULE FOR GENERATING A SET OF SYMBOLS

CROSS REFERENCE TO RELATED APPLICATIONS

This application is a continuation of PCT International Application No. PCT/EP2018/054127, filed Feb. 20, 2018, which claims priority under 35 U.S.C. § 119 from German Patent Application No. 10 2017 203 902.7, filed Mar. 9, 2017, the entire disclosures of which are herein expressly incorporated by reference.

BACKGROUND AND SUMMARY OF THE INVENTION

The invention relates to a motor vehicle having a lighting module for generating a set of symbols.

Lighting modules for motor vehicles, by which symbols are represented on the ground in the environment of the motor vehicle, are known from the prior art. For example, the publication DE 10 2013 211 877 A1 discloses a motor vehicle having a projection module from an array of projection optics. This projection module is used to generate a light distribution, in the form of a light carpet, in the environment of the motor vehicle, and in particular next to the entrance doors. In this case, static images are generated, which have no relation to a current traffic situation.

The document DE 10 2014 204 316 A1 describes a motor vehicle having an optical signal means that projects optical signals onto the ground, which indicate a parking space intended for parking the motor vehicle. The optical signals are projected in an immovable manner onto the surface of the roadway, irrespective of the current position of the motor vehicle relative to the intended parking space.

The document DE 10 2006 050 546 A1 describes a method for representing information, in which a projection means of a motor vehicle is used to generate a projection object that two-dimensionally marks a prospective future location of the motor vehicle.

The publication EP 1 334 869 A2 discloses a motor vehicle having a lighting means that generates a visible light pattern on the ground in the environment of the motor vehicle.

An object of the present invention is to create a motor vehicle having a lighting module for generating a set of symbols on the ground in the environment of the motor vehicle, in order to alert other road users to the motor vehicle, at an early stage and as appropriate to the situation, by means of the set of symbols.

This object is achieved by the motor vehicle according to claim 1. Developments of the invention are defined in the dependent claims.

The motor vehicle according to the invention, which may be a manually controlled or also an autonomously or partially autonomously driving motor vehicle, comprises a lighting module for generating a set of symbols on the ground in the environment of the motor vehicle. Preferably, the lighting module is a projection module that projects the set of symbols onto the ground. Furthermore, the motor vehicle according to the invention comprises a controller for controlling the operation of the lighting module, wherein, if appropriate, the controller may also be a constituent part of the lighting module.

The controller is designed in such a manner that it automatically adapts the relative position of the set of symbols in relation to the motor vehicle, in such a manner that at least part of the set of symbols is fixed at a specified location on the ground in front of the motor vehicle when the motor vehicle, in travelling toward the specified location, is under a predetermined distance from the specified location. The term "in front of the motor vehicle" relates in this case to a region in front of the motor vehicle in the direction of travel. In this case, if appropriate, the location may also be offset in relation to the motor vehicle. In the case of forward travel of the motor vehicle, the location is thus located in front of the motor vehicle, whereas, in the case of reverse travel of the motor vehicle, the location is in front of its rear.

The motor vehicle according to the invention is distinguished in that its controller is configured to control the operation of the lighting module in such a manner that the set of symbols is already (automatically) generated before the motor vehicle is under the predetermined distance in its travel toward the specified location. In this case, for the time period in which the motor vehicle is not yet under the predetermined distance, the set of symbols is moved together with the motor vehicle as a result of the travel of the motor vehicle toward the specified location. Moreover, for this time period, the set of symbols does not extend as far as the specified location.

If appropriate, the motor vehicle according to the invention may also comprise a plurality of the lighting modules, described above, having a correspondingly assigned controller.

According to the invention, the set of symbols may be of any design and contain differing symbols, and in particular also letters and numbers. In particular, the set of symbols is selected in such a manner that a warning or indication signal for other road users is thereby conveyed in an intuitive manner.

The invention has the advantage that, by means of the lighting module of the motor vehicle, a specified location is indicated to other road users at an early stage, despite the corresponding set of symbols, which generates this indication, not yet extending as far as the specified location. In a particularly preferred embodiment, the specified location is a future location of the motor vehicle, such that other road users are alerted to this location at an early stage.

In a further, particularly preferred embodiment, the predetermined distance corresponds to the (maximum) range of the lighting module in the direction of travel of the motor vehicle. An indication of the specified location can thus already be effected when the range of the lighting module does not yet extend as far as the specified location.

In a further preferred embodiment, the controller is designed in such a manner that it determines the specified location automatically from information concerning the environment of the motor vehicle. In a preferred variant of this embodiment, the motor vehicle comprises an environment sensor system and/or a navigation system, wherein the information concerning the environment of the motor vehicle originates, at least partly, from the environment sensor system and/or the navigation system. The environment sensor system is preferably a camera and/or a lidar and/or a radar. The environment sensor system can identify, for example, roads signs that indicate a stopping location of the motor vehicle as a specified location. For example, a road junction located in front of the motor vehicle may be determined by the navigation system, the specified location being located at the road junction.

In a further preferred variant, the motor vehicle according to the invention comprises a communication point, in particular a wireless communication point, in order, by means of this communication interface, at least partly, to receive and provide to the controller the information concerning the environment of the motor vehicle. Preferably the communication interface in this case is a car-to-car and/or car-to-X communication interface. Via such interfaces, information is exchanged between motor vehicles, or between motor vehicles and an infrastructure.

In a further preferred embodiment of the motor vehicle according to the invention, the controller is configured to control the operation of the lighting module in such a manner that the set of symbols remains identical in its representation, at least up to the time point at which the motor vehicle is under the predetermined distance. In other words, up to this time point the set of symbols does not change its properties, such as color, shape, brightness, symbols contained therein, and the like. Only the position of the set of symbols shifts, as a result of the vehicle movement.

In a further preferred embodiment, the controller is configured to control the operation of the lighting module in such a manner that the extent of the set of symbols is (automatically) reduced in the direction of travel of the motor vehicle when the motor vehicle is under a specified distance from the specified location, wherein the specified distance is less than or equal to the predetermined distance. In this way, account is taken of the fact that, as the distance from the specified location decreases, parts of the set of symbols can no longer be suitably represented.

In a further preferred embodiment, the specified location is a stopping location, at which the motor vehicle will come to a stop. This stopping location may be given, for example, by a road sign that instructs stopping at an intersection (e.g. stop sign). If necessary, the braking distance of the motor vehicle may also be taken into account in the definition of the stopping location.

In a preferred variant of the embodiment just described, the set of symbols comprises a stop bar that indicates the stopping location of the motor vehicle when the motor vehicle is under the predetermined distance, wherein the stop bar is preferably a straight bar, which is perpendicular to the longitudinal axis of the motor vehicle relative to its position at the stopping location. In this way, the location of the stopping of the motor vehicle is conveyed to other road users in an intuitive manner.

In a further preferred embodiment, the set of symbols comprises, besides the stop bar, a plurality of further bars at a lesser distance from the motor vehicle than the stop bar, wherein the further bars are preferably parallel to the stop bar.

In a preferred variant of the embodiment just described, the further bars disappear in succession when the motor vehicle is under the specified distance, defined above, from the specified location. Preferably, the further bars continuously reduce their distances from the stop bar, and in so doing merge with each other and ultimately with the stop bar.

In a further design of the motor vehicle according to the invention, the specified location is a point at a road junction. In this case, the set of symbols preferably comprises a navigation arrow, which is depicted at the point of the road junction and indicates the direction of the further travel of the motor vehicle. The direction of the further travel may be determined, for example, from the navigation route along which the motor vehicle is guided by means of the navigation system.

In a further variant, when the motor vehicle is under the specified distance, defined above, from the specified location, the extent of the navigation arrow in the direction of the travel of the motor vehicle is reduced in that the navigation arrow is shortened at its end that is adjacent to the motor vehicle, and/or is compressed as a whole in the direction of travel of the motor vehicle.

The lighting module in the motor vehicle according to the invention may differ in design. As already mentioned above, it is preferably a projection module. In order to ensure a large range of the lighting module, it preferably comprises a laser light source, the light of which is used to generate the set of symbols on the ground. It is also possible that the lighting module is a scanning lighting module that generates the set of symbols via a scanning motion of a light spot on the ground. The position, orientation and shape of the set of symbols can easily be altered by the scanning lighting module.

Exemplary embodiments of the invention are described in greater detail in the following on the basis of the appended figures.

Other objects, advantages and novel features of the present invention will become apparent from the following detailed description of one or more preferred embodiments when considered in conjunction with the accompanying drawings.

DETAILED DESCRIPTION OF THE DRAWINGS

A variant of the motor vehicle according to the invention is described in the following on the basis of an autonomously driving vehicle, which in the figures is denoted by reference number 1. Notwithstanding, the invention is not limited to autonomously driving motor vehicles, but can also be used for partially autonomously driving motor vehicles, or manually controlled motor vehicles.

Figure 1:
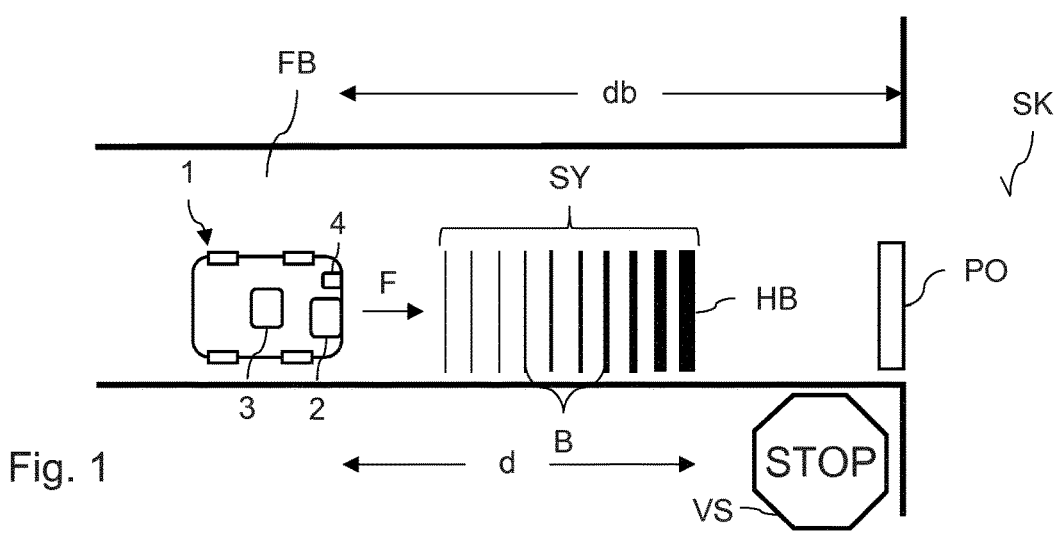
FIG. 1 to FIG. 3 show schematic top views of a scenario that depicts the generation of a set of symbols for indicating a stopping location, according to an embodiment of a motor vehicle according to the invention.
Figure 2:
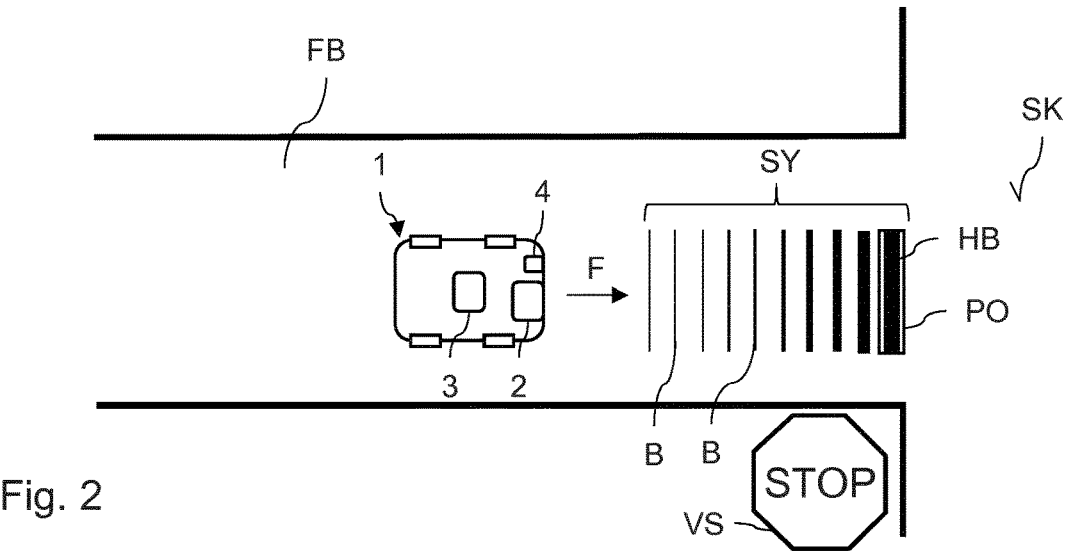
Figure 3:
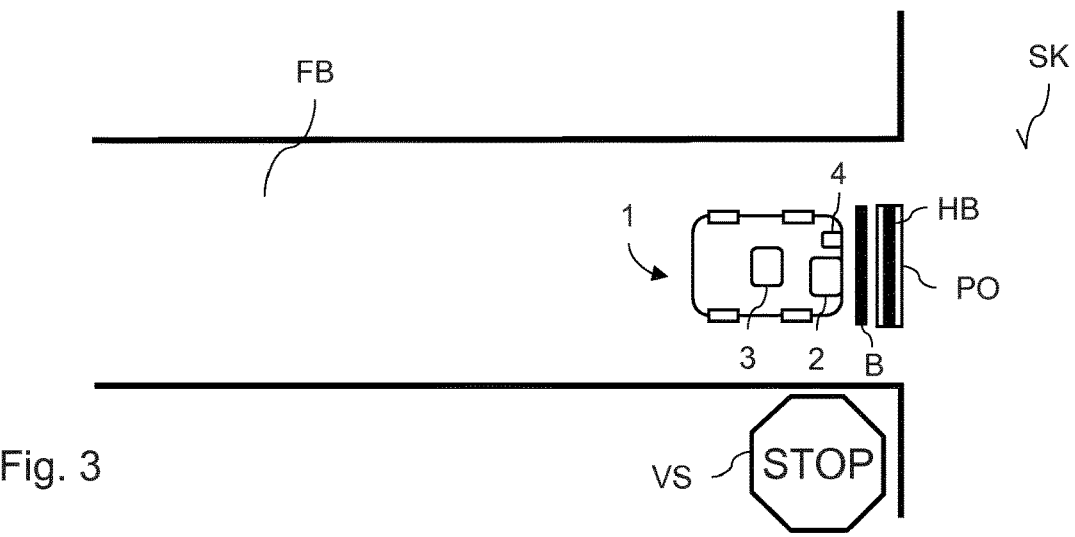

In the scenario according to FIG. 1 to FIG. 3, the motor vehicle 1 is moving on a roadway FB, which in the top views of the figures runs in a horizontal direction. The direction of travel of the motor vehicle is indicated by an arrow F, and the motor vehicle is approaching a road junction SK, at which it meets a road running transversely in relation to the roadway FB. The motor vehicle 1 comprises a lighting module 2 that, in the variant described here, projects a set of symbols SY, composed of a multiplicity of bars running transversely in relation to the roadway FB, onto the ground in front of the motor vehicle 1. The motor vehicle 1 further comprises an environment sensor system 4 such as, for example, a camera, which senses the environment in front of the motor vehicle. Also installed in the motor vehicle 1 is a controller 3 that, inter alia, appropriately controls the lighting module 2, in that it gives corresponding commands to the lighting module to adapt the set of symbols SY.

In the scenario of FIG. 1, the road sign VS, in the form of a stop sign, is identified from the sensor data of the environment sensor system 4 by object recognition software which can, for example, be integrated into the controller 3. From this, the controller 3 deduces the information that the motor vehicle 1 must stop at the stopping location PO, which is indicated as an imaginary bar on the ground. In FIG. 1 the braking distance required for this is denoted by db. Additionally indicated, by the distance d, is the projection range of the lighting module 2.

Although, at the time point of FIG. 1, the projection range d is significantly less than the braking distance db to the stopping location PO, already at this time point the motor vehicle 1 projects a set of symbols SY onto the ground, via the lighting module 2, in order thereby to convey to other road users that the motor vehicle will soon stop, owing to the stop sign. For this purpose, the set of symbols SY includes a multiplicity of bars, the stop bar HB being the bar, at the greatest distance from the motor vehicle, which will indicate the stopping location PO as the motor vehicle approaches further. Besides the stop bar HB, the set of symbols SY comprises further bars B, only some of which are denoted by this reference, for reasons of clarity. The further bars are parallel to the stopping bar HB and are located closer to the front of the motor vehicle 1. The width of these bars decreases continuously as the distance from the front of the motor vehicle decreases.

An essential feature of the embodiment of the motor vehicle according to the invention described here consists in that the set of symbols SY is already projected onto the ground at a time point at which the distance between the front of the motor vehicle and the stopping location PO is greater than the projection range d of the set of symbols. An early indication of the vehicle intention is thereby effected, which, in the case of FIG. 1 to FIG. 3, is braking and associated stopping of the motor vehicle at the stopping location PO.

As long as the distance between the front of the motor vehicle 1 and the stopping location PO is greater than the projection range d, as the motor vehicle moves forward the set of symbols SY is advanced in front of it until, ultimately, the distance between the front of the vehicle and the stopping location PO corresponds to the projection range d. This time point is depicted in FIG. 2. As can be seen there, the stop bar HB is now located at the actual future stopping location PO of the motor vehicle.

As the motor vehicle moves further in the direction toward the stopping location PO, the set of symbols SY is now adapted to the effect that the stopping bar HB is fixed at the stopping location PO, but the rest of the bars B disappear in succession from left to right as the motor vehicle progresses. This is made clear again in FIG. 3, in which the motor vehicle 1 is already at a very short distance from the stopping location PO. As can be seen, owing to the very close position of the motor vehicle 1 to the stopping location PO, the set of symbols SY still includes only the stopping bar HB and a single further bar B, which ultimately also disappears as the motor vehicle progresses, such that, upon stopping of the motor vehicle, only the stopping bar HB still remains.

Figure 4:
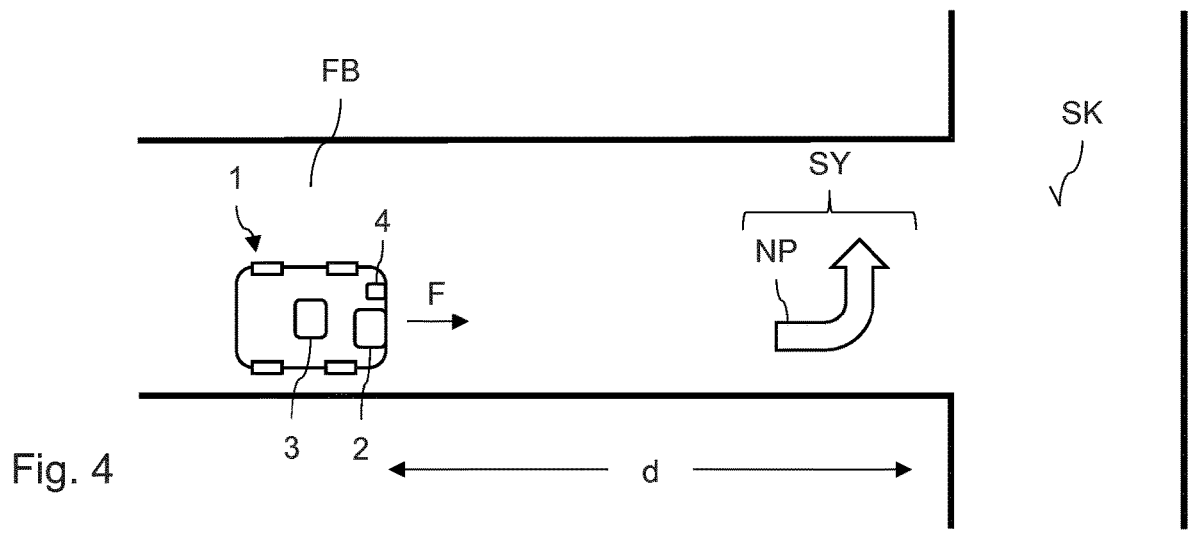
FIG. 4 to FIG. 6 show schematic top views of a scenario that depicts the generation of a set of symbols in the form of a navigation instruction, according to an embodiment of the motor vehicle according to the invention.
Figure 5:
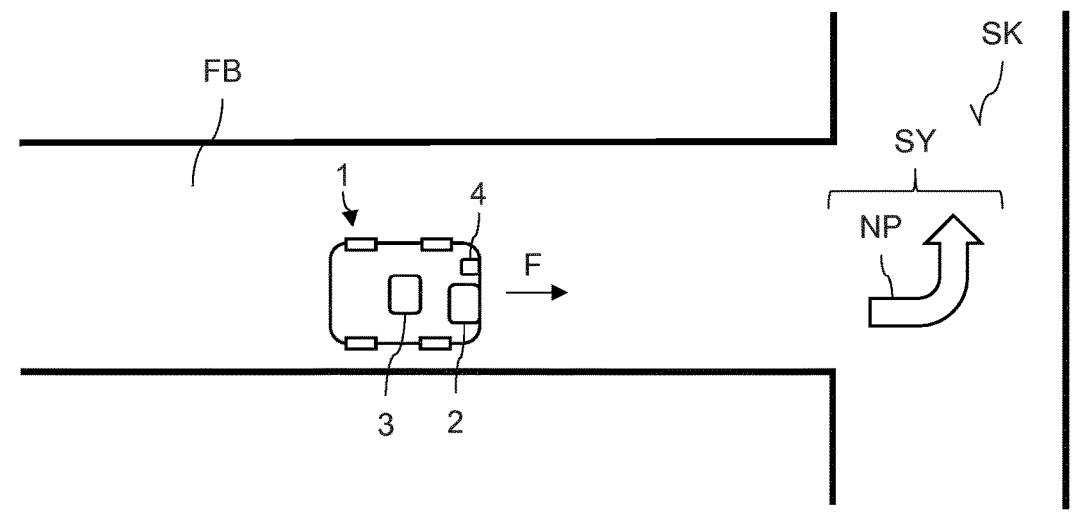
Figure 6:
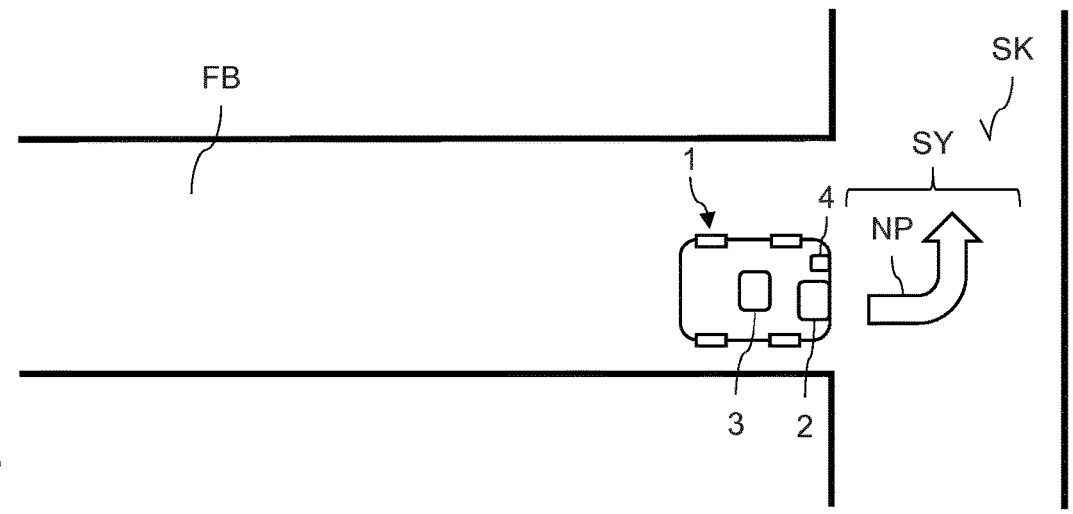

FIG. 4 to FIG. 6 show a second scenario, in which, instead of projecting a set of symbols for indicating a stopping location, the motor vehicle 1 projects, onto the ground in front of itself, a set of symbols in the form of a navigation arrow NP. Just as in FIG. 1 to FIG. 3, the motor vehicle 1 is approaching a road junction SK. As in FIG. 1 to FIG. 3, the motor vehicle 1 comprises the lighting module 2, the environment sensor system 4 and the controller 3 for controlling the lighting module 2. In FIG. 4 to FIG. 6, the motor vehicle additionally comprises a navigation system, not shown, from which there originates the information that the motor vehicle will turn to the left at the road junction SK, in accordance with the current navigation route. Furthermore, it is to be noted that, in FIG. 4 to FIG. 6, the projection range d of the lighting module 2 is greater than the corresponding projection range of the lighting module in FIG. 1 to FIG. 3.

According to FIG. 4, a set of symbols SY, in the form of the leftward turn-off arrow NP, is projected at an early stage onto the roadway in front of the motor vehicle. The projection in this case is effected at a time point at which the distance between the front of the motor vehicle and the mid-point of the road junction SK is still greater than the projection range d of the lighting module 2. As the motor vehicle 1 then comes ever closer to the road junction SK, the navigation arrow NP is shifted further to the right, without altering its position in relation to the front of the motor vehicle, until ultimately the time point shown in FIG. 5 is reached, at which the projection range d corresponds to the distance between the front of the motor vehicle 1 and the middle of the road junction SK.

Upon progression of the motor vehicle, the projection of the lighting module 2 is then adapted in such a manner that the navigation arrow NP is fixed in the middle of the road junction SK, while the motor vehicle 1 further approaches the road junction SK. This is illustrated in FIG. 6, in which the distance of the motor vehicle from the road junction has decreased greatly in comparison with FIG. 5. As can be seen, the navigation arrow NP remains at the middle of the road junction. When the motor vehicle subsequently enters the road junction, the navigation arrow is finally adapted. The adaptation in this case may consist of the left end of the navigation arrow, which is adjacent to the front of the motor vehicle 1, being successively shortened, which conveys the impression of the navigation arrow being "eaten up" by the motor vehicle. Alternatively or additionally, the navigation arrow may also be successively shortened by an optical compression in the direction of the extent of the roadway FB.

The embodiments of the invention described above have a number of advantages. In particular, a change is made between a display of a set of symbols that moves with the motor vehicle and a display of the set of symbols at a fixed location. In this way, an intention of the motor vehicle can be conveyed at an early stage to other road users, even beyond the range of the lighting module, and increased traffic safety thereby achieved.

LIST OF REFERENCES 1 motor vehicle
2 lighting module
3 controller
4 environment sensor system
SY set of symbols
HB stop bar
B bar
PO stopping location
SK road junction
db braking distance
d projection range
FB roadway
VS road sign
NP navigation arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
a lighting module configured to generate a set of symbols on the ground in an environment of the motor vehicle;
a controller configured to control operation of the lighting module, wherein the controller automatically adapts a relative position of the set of symbols in relation to the motor vehicle based on a direction of travel of the motor vehicle, such that at least part of the set of symbols is fixed at a specified location on the ground in front of the motor vehicle when the motor vehicle, in travelling toward the specified location, is within a predetermined distance from the specified location;
wherein the controller is configured to control the operation of the lighting module such that the set of symbols is already generated on the ground before the motor vehicle is within the predetermined distance while travel toward the specified location, wherein, for a time period in which the motor vehicle is not yet within the predetermined distance, the set of symbols is moved together with the motor vehicle as a result of the motor vehicle travelling toward the specified location, and does not extend as far as the specified location.

2. The motor vehicle according to claim 1, wherein the predetermined distance corresponds to a range of the lighting module in the direction of travel of the motor vehicle.

3. The motor vehicle according to claim 2, wherein the controller is configured to control the operation of the lighting module such that the set of symbols generated on the ground is reduced in the direction of travel of the motor vehicle when the motor vehicle is within a specified distance from the specified location, wherein the specified distance is less than or equal to the predetermined distance.

4. The motor vehicle according to claim 2, wherein the specified location is a stopping location, at which the motor vehicle will come to a stop.

5. The motor vehicle according to claim 1, wherein the controller determines the specified location automatically from information concerning the environment of the motor vehicle.

6. The motor vehicle according to claim 5, wherein the motor vehicle further comprises at least one of an environment sensor system and a navigation system, wherein the information concerning the environment of the motor vehicle originates, at least partly, from the at least one of the environment sensor system and the navigation system.

7. The motor vehicle according to claim 6, wherein the controller determines the specified location automatically from information concerning the environment of the motor vehicle received from the at least one of the environment sensor system and the navigation system.

8. The motor vehicle according to claim 1, wherein the controller is configured to control the operation of the lighting module such that the set of symbols generated on the ground is reduced in the direction of travel of the motor vehicle when the motor vehicle is within a specified distance from the specified location, wherein the specified distance is less than or equal to the predetermined distance.

9. The motor vehicle according to claim 1, wherein the specified location is a stopping location, at which the motor vehicle will come to a stop.

10. The motor vehicle according to claim 9, wherein the set of symbols comprises a stop bar that indicates the stopping location of the motor vehicle when the motor vehicle is under the predetermined distance, wherein the stop bar is a straight bar, which is perpendicular to the longitudinal axis of the motor vehicle relative to a position of the stop bar at the stopping location.

11. The motor vehicle according to claim 10, wherein the set of symbols further comprises a plurality of further bars at a lesser distance from the motor vehicle than the stop bar, wherein the further bars are parallel to the stop bar.

12. The motor vehicle according to claim 11, wherein the further bars disappear in succession when the motor vehicle is within the specified distance from the specified location, wherein the further bars continuously reduce their distances from the stop bar, and in so doing merge with each other and ultimately with the stop bar.

13. The motor vehicle according to claim 1, wherein the specified location is a point at a road junction.

14. The motor vehicle according to claim 13, wherein the set of symbols comprises a navigation arrow, which is depicted at the point of the road junction and indicates the direction of further travel of the motor vehicle.

15. The motor vehicle according to claim 14, wherein the navigation arrow is at least one of shortened at an end that is adjacent to the motor vehicle and compressed as a whole in the direction of travel of the motor vehicle when the motor vehicle is under the specified distance from the specified location.

* * * * *